United States Patent [19]

Ruppe, Jr.

[11] 4,117,912

[45] Oct. 3, 1978

[54] MEANS FOR REDUCING THE GAP BETWEEN ROTOR-BACKING PLATE INTERFACE DURING BRAKE DEPRESSURIZATION

[75] Inventor: Joseph P. Ruppe, Jr., South Bend, Ind.

[73] Assignee: The Bendix Corporation, Southfield, Mich.

[21] Appl. No.: 816,242

[22] Filed: Jul. 18, 1977

[51] Int. Cl.² ................... F16D 55/48; F16D 65/22
[52] U.S. Cl. ........................... 188/216; 188/71.5; 188/72.3
[58] Field of Search ............... 188/18 A, 71.5, 71.8, 188/72.3, 196 F, 216

[56] References Cited

U.S. PATENT DOCUMENTS

| | | |
|---|---|---|
| 2,756,847 | 7/1956 | Puse et al. ............... 188/72.3 X |
| 3,018,852 | 1/1962 | Stanton ................. 188/216 X |
| 3,692,150 | 9/1972 | Ruppe, Jr. ............... 188/71.5 |
| 3,958,833 | 5/1976 | Stanton ................ 188/71.5 X |

*Primary Examiner*—Duane A. Reger
*Attorney, Agent, or Firm*—Leo H. McCormick, Jr.; Ken C. Decker

[57] ABSTRACT

In an aircraft multiple disc brake assembly utilizing carbon composite rotors and stators, an excessive gap occurs at the rotor-backing plate interface during brake depressurization. This gap allows oxidation of the carbon material at the interface thereby reducing friction performance and increasing wear. A spring is disposed between the backing plate and its friction surface thereby axially moving the friction surface closer to the surface of the adjacent rotor to reduce this gap.

10 Claims, 4 Drawing Figures

MEANS FOR REDUCING THE GAP BETWEEN ROTOR-BACKING PLATE INTERFACE DURING BRAKE DEPRESSURIZATION

BACKGROUND OF THE INVENTION

The present invention relates to an aircraft multiple disc aircraft brake using carbon composite rotors and stators. Carbon composite material provides excellent friction and heat absorbing characteristics; however, such material is susceptible to oxidation at high temperatures. Many methods well known in the brake art, have been adapted to reduce this oxidation characteristic. One method reduces the brake running clearance, which applicant's invention provides a further improvement thereover.

SUMMARY OF THE INVENTION

Oxidation of carbon composite rotors and stators at elevated temperatures is a serious problem in an aircraft brake because oxidation adversely affects the wear performance and structural integrity of the discs. The non-rubbed regions of the discs are commonly protected from oxidation by various forms of metallic and non-metallic barriers and by chemical coatings and impregnants; as for example, in U.S. Pat. No. 3,983,972. Oxidation of the rubbed regions of the discs cannot be prevented by barriers or coatings because they generally adversely affect the coefficient of friction and wear characteristics of these regions. A common way of reducing oxidation of the rubbed regions is to reduce the brake running clearance distance between adjacent friction surfaces. This brake running clearance is established by well-known adjusters. The sum total clearance between all adjacent friction surfaces for a brake with conventional metallic composite friction discs is on the order of 0.25 inches and this clearance has been reduced to a sum total distance on the order of 0.050 inches for a brake using carbon composite material. This much reduced clearance for carbon discs has drastically reduced the deleterious effects of oxidation for a majority of the discs in the brake. However, tests have indicated that because of the compressibility and spring-back characteristics of certain carbon composite material, this brake running clearance is not evenly distributed throughout the brake but is concentrated at the backing plate/rotor interface where the largest gap occurs. Test results indicate that this gap increases friction surface softening and the backing plate/rotor interface wears faster than the remainder of the discs in the brake.

Applicant's invention provides a simple mechanism to reduce this rotor/backing plate gap and thereby reduce the surface area exposed to the effects of oxidation.

It is an object of the present invention to provide a simple mechanism to reduce the gap which occurs at the backing plate/rotor disc interface during brake depressurization.

DESCRIPTION OF THE PREFERRED EMBODIMENT

Figure 1:
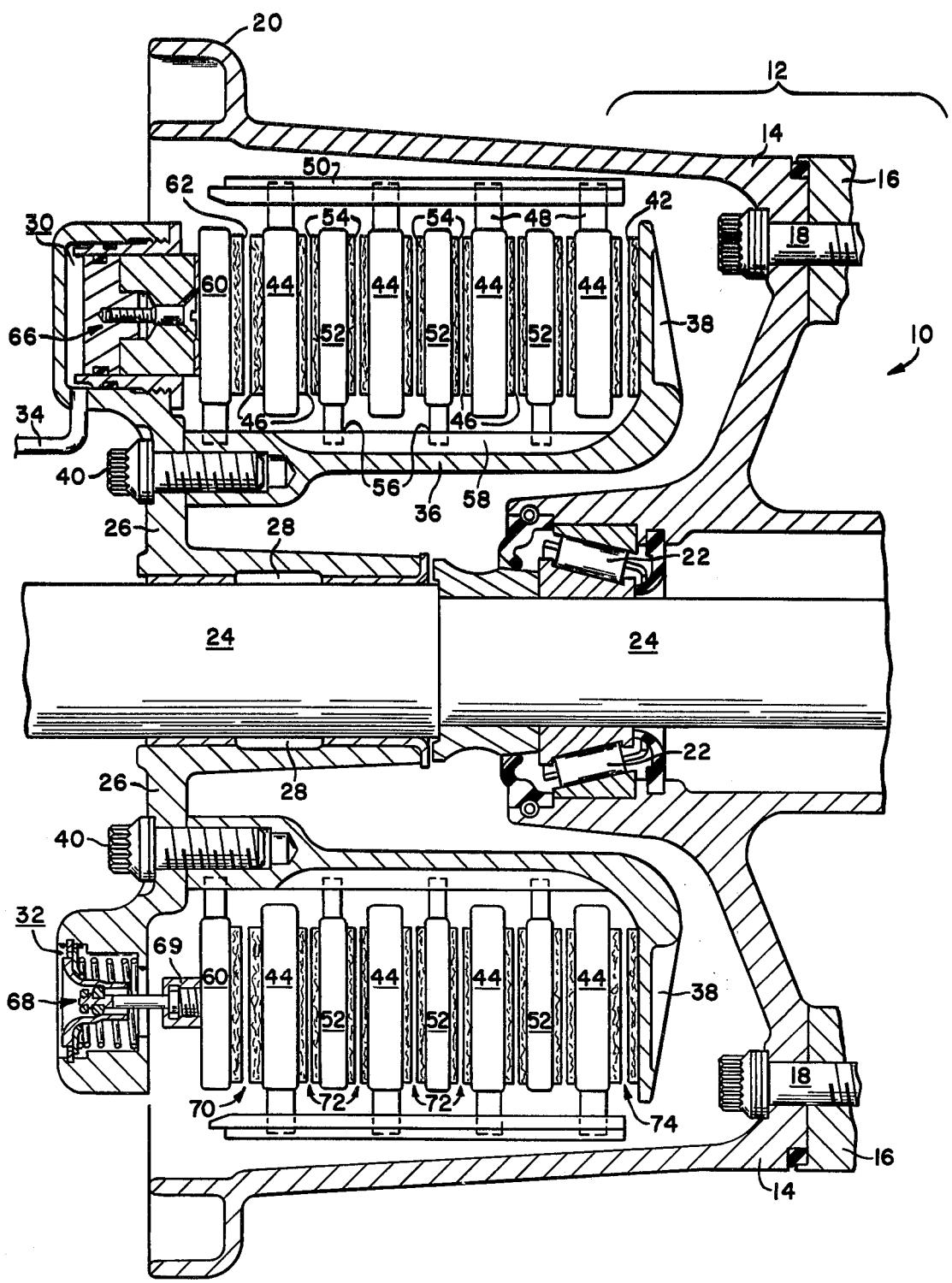
FIG. 1 is a sectional schematic representation of a conventional aircraft wheel and multiple disc brake assembly.

Referring to FIG. 1, numeral 10 designates a conventional aircraft wheel and multiple disc brake assembly. Assembly 10 includes a wheel 12 defined by two annular sections 14, 16, only one of which is fully shown, fastened together by circumferentially spaced apart bolts and nuts generally indicated by 18. Each wheel section 14, 16 has a circumferential tire flange 20. Reference is made to U.S. Pat. Nos. 2,990,216 and 2,998,282 for a detailed discussion of the wheel construction. The wheel 12 is rotatably journaled by bearing means 22 on a nonrotatable fixed axle 24 carried by conventional aircraft landing gear structure, not shown. An annular brake carrier 26 is secured in a non-rotatable position relative to the wheel by any suitable means known to those skilled in the art; the method shown is by using conventional keys or splines 28 to directly secure carrier 26 to the non-rotatable fixed axle 24. Two other common methods, not shown, are generally known as flanged mounting, wherein carrier 26 is bolted to a flange member secured to axle 24, and torque arm mounting, wherein carrier 26 is fixed in its position relative to the wheel 12 by a torque arm member secured directly to the landing gear structure. The brake carrier 26 is provided with a plurality of circumferentially spaced apart cavities 30 and holes 32, only one of each is shown. Cavities 30 are fluidly connected via passage 34 to a source of pressurized fluid, not shown, controlled by the aircraft pilot. A generally cylindrical torque tube 36 having an integral annular backing plate 38 is fixedly secured to carrier 26 by a plurality of circumferentially spaced apart bolts 40. Backing plate 38 is shown in an annular configuration integral with torque tube 36 and having friction surface 42 secured thereto, however, many other mountings and configurations are well known to those skilled in the aircraft brake art.

A plurality of spaced apart annular brake rotor members 44 having friction surfaces 46 on opposite axial faces thereof are suitably keyed at 48 to a plurality of circumferentially spaced apart key or retaining members 50. The retaining members 50 are fixedly secured to wheel section 14 and are adapted to permit axial movement of the rotor members 44 relative to wheel section 14 while rotating therewith. A plurality of non-rotatable annular brake stator members 52 having friction surfaces 54 on opposite axial faces thereof are interleaved with the rotor members 44 and keyed at 56 to a plurality of circumferentially spaced apart spline sections 58 of torque tube 36 for axial movement relative therealong. A pressure plate 60 having a friction surface 62 is suitably keyed at 64 to spline sections 58 for axial movement therealong.

A plurality of fluid pressure responsive piston means generally indicated as 66 are disposed in cavities 30 and bear against the pressure plate 60. Brake adjusting and retraction units generally indicated as 68 are disposed in circumferentially spaced apart holes 32 and secured at 69 to the pressure plate 60. The construction and operation of both piston means 66 and adjusters 68 are well known in the aircraft brake art and have many other embodiments. Reference is made to U.S. Pat. No. 3,376,959 for a detailed discussion of those indicated herein. For the purposes of this disclosure it is sufficient to understand that upon a brake application, piston means 66 are simultaneously pressurized thereby axially displacing pressure plate 60 towards backing plate 38. The axial displacement of pressure plate 60 compresses all the frictional surfaces 46, 54, 42, and 62 of the rotor members, 44 stator members 52, backing plate 38 and pressure plate 60, respectively, into engagement, thereby retarding the rotation of the wheel 12. The piston means 66 are adapted to have an axial travel sufficient to compensate for the accumulated axial wear of the frictional surfaces. Upon brake depressurization, the pressure plate 60 and each piston of the piston means is axially retracted a predetermined distance under the influence of the brake adjusters 68, thereby establishing a corresponding brake running clearance between adjacent surfaces of the brake assembly, indicated as distance 70 between friction surface 62 of the pressure plate 60 and frictional surface 46 of the adjacent rotor member 44; distance 72 between friction surfaces 46, 54 of adjacent rotor members 44 and stator members 52; and distance 74 between the backing plate friction surface 42 and frictional surface 46 of the adjacent rotor member 44. In theory, it is desired to maintain a constant brake running clearance throughout the brake stack but in actual operation the distance 70, distance 74, and each of the distances 72 are different use of the brake. The adjusters 68 also serve to automatically axially advance the pressure plate 60 to compensate for wear of the frictional surfaces, thereby maintaining fairly constant brake running clearances 70, 72, 74 over the operational life of the assembly.

There are many compositions and configurations of frictional surfaces 42, 46, 54, and 62 known in the brake art. Reference is made to the following U.S. Patents, for examples of semi-metallic composition and structure: Nos. 3,037,860; 3,237,731; 3,269,489; 3,376,960; 3,473,635; and 3,844,800; and for examples of carbon composition and structure: U.S. Pat. Nos. 3,473,637; 3,650,357; 3,891,066; 3,948,363; and 3,970,174. Although shown separately for emphasis, it is well known in the brake art that if the rotor and stator members 45, 52 are made of carbon composite material, the frictional surfaces 46, 54 are homogeneous with their corresponding rotor and stator members 44, 52.

As discussed hereinabove, the rotors 44 and stators 52 are made entirely of carbon composite material because of its excellent coefficient of friction and high heat sink capability. Also, the aforementioned homogeneous construction eliminates separate frictional surfaces 46, 55. This carbon composite material has some disadvantages, one of which is solved by applicant's invention.

To solve the aforementioned oxidation problem when using carbon composite rotors and stators, the applicant presents two embodiments that reduce the brake running clearance distance 74 between the backing plate 38 friction surface 42 and the adjacent rotor's 44 friction surface 54. The two embodiments shown in FIGS. 2 and 3 differ because the torque tube members are different. Like parts are identified from FIG. 1 by the addition of 100 and 200 respectively.

Figure 2:
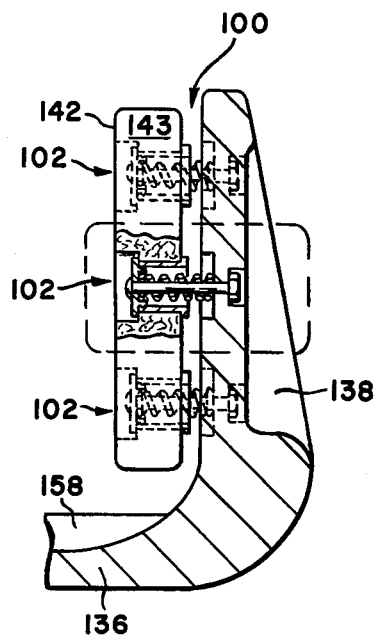
FIG. 2 is an enlarged schematic of FIG. 1 illustrating the present invention in a brake where the backing plate's friction surface is attached directly to the backing plate.
Figure 4:
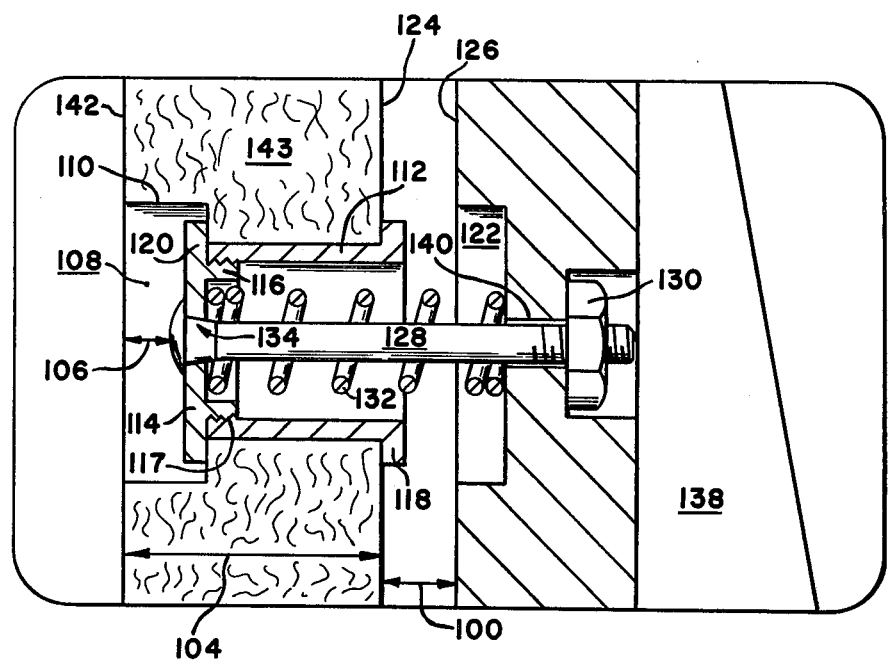
FIG. 4 is an enlarged view of the circumscribed portion of FIG. 2 depicting a schematic of one of the mechanisms for securing the friction surface of the pressure plate.

FIGS. 2 and 4, the carbon composite friction surface 142 is moved axially away from backing plate 138 a constant distance 100 upon brake depressurization. In order to withstand the torque of the braking forces, friction material 143 is secured to backing plate 138 with a plurality of circumferentially spaced apart bolt means, generally indicated as 102, one of which is shown in detail in FIG. 4. The size and number of bolt means 102 depend upon the specific carbon composition used and the braking torque experienced. Friction material 143 has an overall thickness 104 with an effective wear thickness 106. Hole 108 is countersunk at 110 and is adapted to receive bolt 102. The bolt 128 includes a cylinder 112 and an annular cap 114. Cylinder 112 is adapted to fit snugly within hole 108 in order to evenly distribute the braking torque. Cap 114 has a cylindrical, inwardly extending protrusion 116 adapted to be secured to cylinder 112 by threads 117. Cap 114 and cylinder 112 are kept snug to friction material 143 during axial movement thereof by the engagement of annular shoulder 118 of cylinder 112 and portion 120 of cap 114 with the friction material 143. Backing plate 138 has a countersunk hole 122 of sufficient size and depth to receive shoulder 118 thereby allowing surface 124 of frictional material 143 to be in full contact with surface 126 of backing plate 138 during a brake application thereby evenly transmitting the axial forces to backing plate 138. Bolt 128 and nut 130 secure material 143 to backing plate 138 and establish the distance 100 upon brake depressurization. Spring 132 provides the necessary force of the spring to move the friction material 143 axially away from backing plate 138 and is held in place by bolt 128. Bolt 128 is adapted to be pressfit through hole 134, cap 114 and slidable along hole 140 in backing plate 138 thereby displacing nut 130 axially upon brake pressurization.

Figure 3:
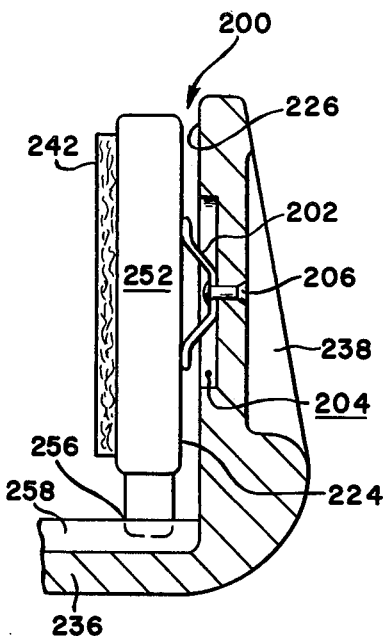
FIG. 3 is an enlarged schematic of the present invention in a brake where the backing plate's friction surface is provided by a separate stator disc splined to the torque tube.

FIG. 3 is an embodiment where the friction surface 242 at the backing plate is provided by a separate stator member 252. Note that this arrangement requires longer splines 258 along torque tube 236. Although shown separately, it is noted that the utilization of carbon material makes friction surface 242 integral with the complete thickness of stator member 252. Because all the braking torque on friction surface 242 is transmitted to torque tube 236 through spline 258 at 256 a simple leaf or disc spring 202 is utilized to maintain the constant distance 200 upon brake depressurization. Spring 202 is secured to backing plate 238 in recessed hole 204 by rivet means 206. Hole 204 is adapted to be sufficient diameter and depth in order to contain spring 202 during brake pressurization. Upon brake pressurization stator 252 moves axially toward backing plate 238 until its surface 224 bears against surface 226 thereby transmitting the axial forces to backing plate 238. Surface 224 is also carbon but because it is a non-rubbed surface, it is chemically treated to prevent oxidation thereof.

The above-described embodiments are just two of the many possible arrangements that may be incorporated into a number of different backing plate configurations to move the backing plate friction surface axially during brake depressurization.

I claim:
1. An aircraft multiple disc brake assembly having:
   a wheel member rotatably mounted on a non-rotatable shaft;
   a torque-absorbing member carried by said shaft for effectuating braking of said wheel member, said torque-absorbing member having a backing plate portion and an axial portion;
   fastener means for connecting a first friction surface to said backing plate portion;

a pressure plate member engaged with said axial portion and axially moveable therealong, said pressure plate member having a second friction surface axially facing the first friction surface;

a plurality of rotor disc members disposed in the area between said first and second friction surfaces of said pressure plate member and said backing plate portion, said rotor disc members having opposite axial ends with a plurality of third friction surfaces thereon, said rotor disc members mounted for rotation with said wheel member and axially moveable therealong;

a plurality of stator disc members disposed in the area between said first and second friction surfaces of said pressure plate member and said backing plate portion, said stator disc members being interleaved with said rotor disc members and operatively engaged with said axial portion of said torque absorbing member and axially moveable therealong, said stator disc members having a plurality of opposite axial ends with fourth friction surfaces thereon;

fluid pressure responsive force producing means secured to said torque absorbing member for moving said pressure plate member axially toward said backing place portion thereby compressing all said first, second, third and fourth friction surfaces into engagement with each other in response to a brake signal to effect a brake application;

brake retraction means operatively connected to said torque absorbing member for disengaging all said first, second, third and fourth friction surfaces on termination of said brake signal; and said interleaved rotor and stator disc member arrangement being adapted to have one of said third friction surfaces of one said rotor disc member adjacent one of said fourth friction surfaces of said stator disc, and all said plurality of third and fourth friction surfaces being adapted to have substantially equal axial distance spacing between adjacent friction surfaces when said wheel member is rotating in the absence of a brake signal;

wherein the improvement comprises spring means disposed between said backing plate portion and said first friction surface for moving said first friction surface axially toward one of the plurality of fourth friction surfaces of said adjacent rotor disc member to decrease said axial distance spacing therebetween in the absence of a brake signal and thereby reduce the degregation of said first friction surface through oxidation.

2. An aircraft multiple disc brake assembly as claimed in claim 1, wherein:

said first friction surface connected to said backing plate portion comprises a said stator disc member having said spring means disposed between said backing plate portion and said axial end of said stator adjacent said backing plate portion.

3. An aircraft multiple disc brake assembly as claimed in claim 1, wherein said fastener means transmits brake torque from said first friction surface to said backing plate portion.

4. An aircraft multiple disc brake assembly as claimed in claim 3 wherein:

the third and fourth plurality of friction surfaces of said rotor and stator disc members are composed of carbon composite material such that their respective said friction surfaces are homogeneous therewith; and said first and second friction surfaces connected to said pressure plate member and said backing plate portion are composed of carbon composite material.

5. An aircraft multiple disc brake assembly as claimed in claim 2, wherein:

the third and fourth friction surfaces of said rotor and stator disc members are composed of carbon composite material such that their respective said friction surfaces ae homogeneous therewith; and said second friction surface of said pressure plate member is also composed of carbon composite material.

6. An aircraft multiple disc brake assembly as claimed in claim 4, wherein:

said fastener means includes a plurality of circumferentially spaced bolt members operatively secured to both said first friction surface and said backing plate portion.

7. An aircraft multiple disc brake assembly as claimed in claim 1, wherein;

said brake retraction means is also secured to said pressure plate member for moving said pressure plate member axially away from said backing plate portion to disengage said first, second, third and fourth friction surfaces from each other in the absence of a brake signal.

8. An aircraft multiple disc brake assembly as claimed in claim 1, wherein:

said brake retraction means is further adapted to be contained within said fluid pressure responsive force producing means.

9. A wheel and brake assembly for an aircraft comprising:

a wheel member rotatably mounted on said aircraft;

torque-absorbing means mounted on said aircraft and carrying a backing plate member;

fastener means for attaching a first friction surface to said backing plate member;

brake application effecting means including a pressure plate member extending generally parallel to said backing plate member and slidably relative to said torque-absorbing means, said pressure plate member having a second friction surface;

rotor members and stator members located between the pressure plate member and the backing plate member, said rotor members and stator members being slidable on said wheel member and on said torque-absorbing means respectively, each of said rotor and stator members carrying third friction surfaces;

said brake application effecting means including means for moving said pressure plate member toward the backing plate member to urge said third friction surfaces into frictional engagement with one another in response to a brake signal and thereby effect a brake application; and resilient means defining a yieldable connection between said backing plate member and said first friction surace for urging said first friction surface away from said backing plate member and toward said pressure plate member when said brake is released.

10. A wheel and brake assembly for an aircraft as claimed in claim 9, wherein:

said first friction surface of said backing plate member includes a stator member having said resilient means disposed between said backing plate member and said stator member for urging said stator member toward said pressure plate member when said brake is released.

* * * * *